(12) United States Patent
Fei

(10) Patent No.: US 7,598,648 B2
(45) Date of Patent: Oct. 6, 2009

(54) 2/6 POLE SINGLE-PHASE INDUCTION MOTOR HAVING SHARED WINDINGS

(75) Inventor: Renyan William Fei, Qingdao (CN)

(73) Assignee: Emerson Electric Co., St. Louis, MO (US)

( * ) Notice: Subject to any disclaimer, the term of this patent is extended or adjusted under 35 U.S.C. 154(b) by 468 days.

(21) Appl. No.: 11/295,020

(22) Filed: Dec. 5, 2005

(65) Prior Publication Data
US 2007/0126307 A1    Jun. 7, 2007

(51) Int. Cl.
*H02K 1/00*    (2006.01)
(52) U.S. Cl. .................................. 310/184; 310/198
(58) Field of Classification Search ............... 310/179, 310/180, 198, 184
See application file for complete search history.

(56) References Cited

U.S. PATENT DOCUMENTS 4,473,788 A * 9/1984 Kirschbaum ................ 318/776
5,825,111 A * 10/1998 Fei .............................. 310/179
6,175,209 B1    1/2001 Fei
6,707,214 B1    3/2004 Fei
6,815,926 B2    11/2004 Fei et al.

FOREIGN PATENT DOCUMENTS

JP    3432145    5/2003

OTHER PUBLICATIONS

"Design and Test Analysis of Single-Phase Induction Motors with 4-8 Pole Common Winding," Renyan W. Fei and Jerry D. Lloyd, IEEE Transactions on Industry Applications, vol. 31, No. 6, Nov./Dec. 1995, pp. 1-4.

* cited by examiner

*Primary Examiner*—Dang D Le
(74) *Attorney, Agent, or Firm*—Harness, Dickey & Pierce, P.L.C.

(57) ABSTRACT

A multi-speed single-phase induction motor including a stator having a main winding selectively adapted for 2n-pole operation and 6n-pole operation, where n is an integer. The main winding includes a plurality of coil sets. The motor is configured to energize at least one of the coil sets during 2n-pole operation and during 6n-pole operation.

29 Claims, 7 Drawing Sheets

2/6 POLE SINGLE-PHASE INDUCTION MOTOR HAVING SHARED WINDINGS

FIELD

The present disclosure relates to single-phase induction motors having shared windings.

BACKGROUND

The statements in this section merely provide background information related to the present disclosure and may not constitute prior art.

A wide variety of multi-speed motors are known in the art. For example, 2/6 pole motors are known in which one set of stator windings are provided for 2-pole operation and another set of stator windings are provided for 6-pole operation. In other words, a 2-pole winding is "stacked" onto a 6-pole winding (or vice versa) within a single stator. As recognized by the present inventor, this results in an inefficient use of winding material because during 2-pole operation, the 6-pole winding is idle and, during 6-pole operation, the 2-pole winding is idle. Some shared winding approaches have been proposed for three-phase 2/6 pole induction motors. However, these approaches do not work for single-phase motors.

SUMMARY

According to one embodiment, a multi-speed single-phase induction motor includes a stator having a main winding selectively adapted for 2n-pole operation and 6n-pole operation, where n is an integer. The main winding includes a plurality of coil sets. The motor is configured to energize at least one of the coil sets during 2n-pole operation and during 6n-pole operation.

According to another embodiment, a multi-speed single-phase induction motor includes a stator having a main winding selectively adapted for 2n-pole operation and 6n-pole operation, where n is an integer. The main winding includes at least a first coil set, a second coil set and a third coil set. The motor is configured to energize the first coil set, the second coil set, and the third coil set during 6n-pole operation, and to selectively reverse a direction of current in at least the first coil set while maintaining the direction of current in at least the second coil set to selectively switch from 6n-pole operation to 2n-pole operation.

According to yet another embodiment, a multi-speed single-phase induction motor includes a stator having a main winding selectively adapted for 2n-pole operation and 6n-pole operation, where n is an integer. The main winding includes at least a first winding portion and a second winding portion. The motor is configured to electrically connect the first winding portion and the second winding portion in series during one of the 2n-pole operation and the 6n-pole operation, and to electrically connect the first winding portion and the second winding portion in parallel during the other of the 2n-pole operation and the 6n-pole operation.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, its applications, or uses.

A multi-speed single-phase induction motor according to one embodiment includes a stator having a main winding. The main winding includes multiple coil sets and is configured to energize at least one of the coil sets during two-pole operation and during six-pole operation. Because at least one of the coil sets is shared or used during both two-pole operation and six-pole operation, the amount of active material (typically copper) required for the main winding is reduced as compared to a motor employing two independent windings for two-pole and six-pole operation. This reduction in active material can result in material and manufacturing cost reductions, as well as a more compact motor design. One example of a 2/6 pole single-phase induction motor having at least one shared coil set will now be described with reference to the stator illustrated in FIGS. 1A and 1B and indicated generally by reference number 100.

Figure 1A:
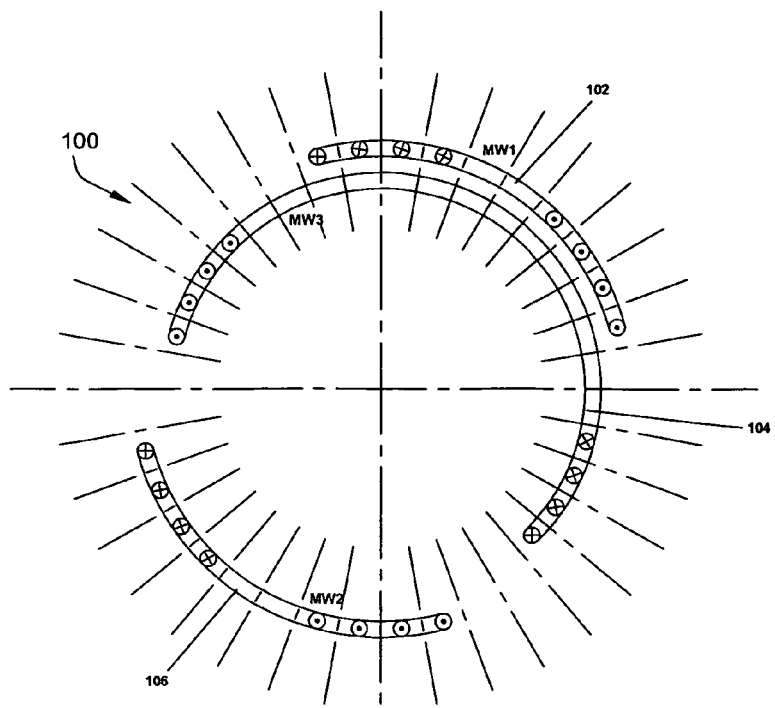
FIG. 1A is a stator winding diagram for an induction motor energized for 6-pole operation according to one embodiment.
Figure 1B:
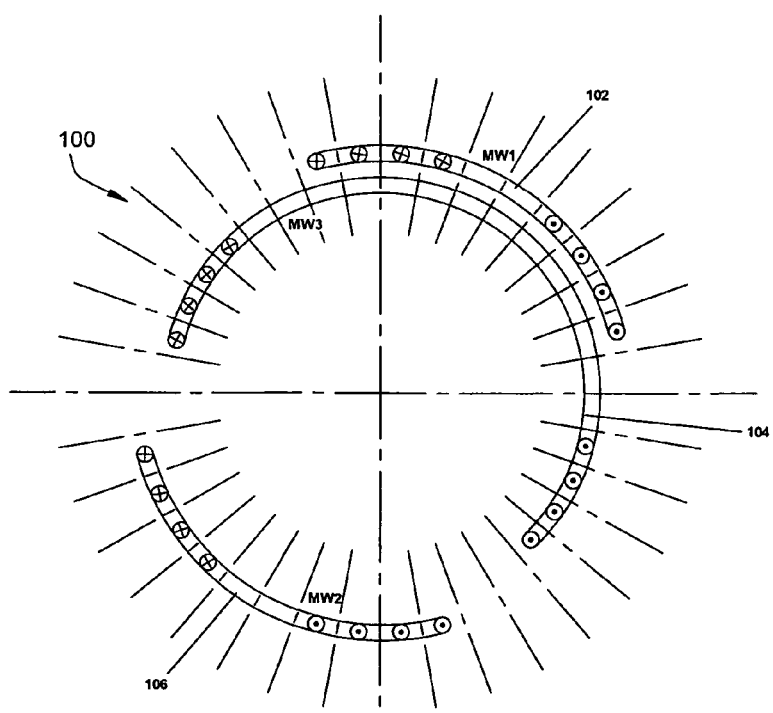
FIG. 1B is a stator winding diagram for the induction motor of FIG. 1A energized for 2-pole operation.

As shown in FIG. 1A, the stator 100 includes a main winding having three coils sets 102, 104, and 106. The main winding is configured for at least two-pole operation and six-pole operation. In FIG. 1A, the coil sets 102-106 are shown energized for 6-pole operation. By reversing the direction of current in coil set 104 while maintaining the direction of current in coil sets 102, 106, operation of the electric motor can be switched from 6-pole operation to 2-pole operation. This is illustrated in FIG. 1B. Thus, in the embodiment of FIGS. 1A and 1B, all three coil sets 102, 104, 106 are energized during two-pole operation and during six-pole operation. This provides a significant reduction in active material as compared to a motor employing an independent winding for two-pole operation and another independent winding for six-pole operation. It should be emphasized, however, that any sharing of the coil sets 102, 104,106 between 2-pole and 6-pole operation results in active material savings. Further, it should be understood that less than all of the coil sets 102, 104, 106 can be shared between 2-pole operation and 6-pole operation without departing from the scope of this disclosure.

As an alterative to reversing the direction of current in coil set 104, the direction of current in coil sets 102 and 106 can be reversed while maintaining the direction of current in coil set 104 in order to switch between 2-pole and 6-pole operation.

Figure 2:
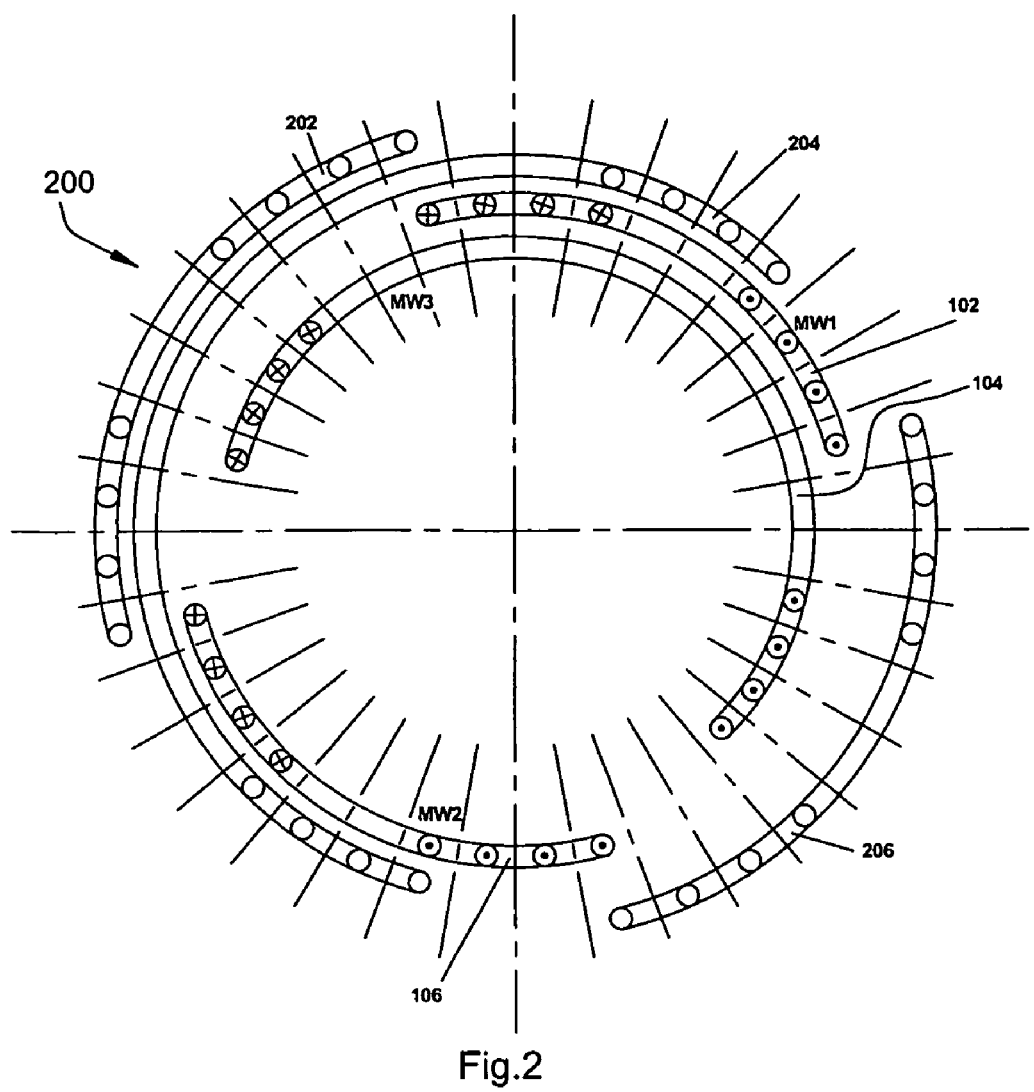
FIG. 2 is a stator winding diagram for a PSC motor according to another embodiment.

FIG. 2 illustrates a stator 200 for a permanent split-capacitor (PSC) motor according to another embodiment. As shown in FIG. 2, the stator 200 includes the main winding of FIGS.

1A and 1B (including coil sets 102, 104, 106) as well as an auxiliary winding having coil sets 202, 204, 206. In this embodiment, the auxiliary winding coil sets 202-206 are configured in substantially the same way as the main winding coil sets 102-106, except that the auxiliary winding coil sets 202-206 are shifted ninety degrees as compared to the main winding coil sets 102-106.

It should be understood that in addition to PSC motors, the teachings of this disclosure can be applied to other types of electric motors including, for example, capacitor-start and split-phase motors.

In the specific embodiments illustrated in FIGS. 1 and 2, each coil set 102-106 and 202-206 includes four concentric coils having different winding pitches. However, a different number of concentric or non-concentric coils having the same or different winding pitches can also be employed without departing from the scope of this disclosure.

Further, although FIGS. 1 and 2 illustrates stators 100, 200 having thirty-six slots, it should be appreciated that a different number of slots can be employed in any given application of these teachings.

Figure 3A:
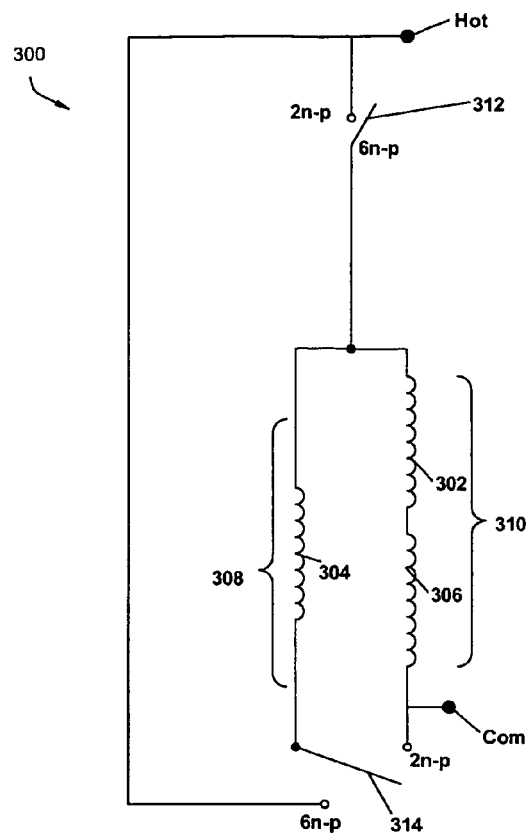
FIGS. 3A-3C are stator winding circuit schematics for an induction motor according to another embodiment.
Figure 3B:
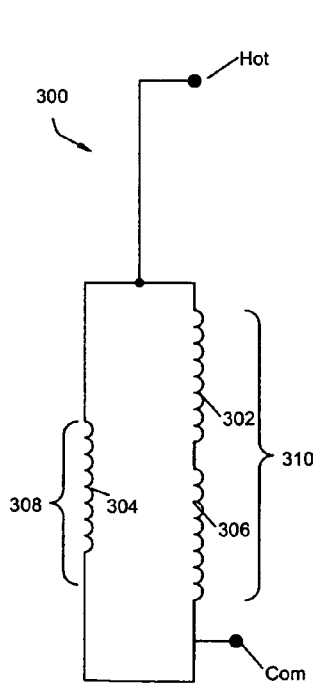
Figure 3C:
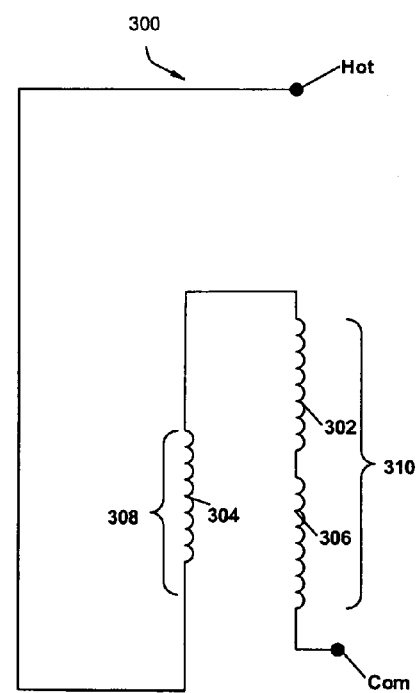

FIGS. 3A-3C illustrate a main winding circuit 300 for an induction motor according to another embodiment. As shown in FIG. 3A, the main winding circuit 300 includes two winding portions 308, 310. Winding portion 308 includes coil set 304, and winding portion 310 includes coil sets 302, 306. The main winding circuit 300 further includes switches 312, 314 for selectively connecting the winding portions 308, 310 for either two-pole operation or six-pole operation (assuming the motor has only two speeds). In the particular embodiment of FIGS. 3A-3C, switch 312 is a single-pole, single throw switch, and switch 314 is a single-pole, double throw switch. Alternatively, other types of switches can be employed.

FIG. 3B illustrates the main winding circuit 300 when the switches 312, 314 are set for two-pole operation. During two-pole operation, winding portions 308, 310 are electrically connected in parallel.

FIG. 3C illustrates the main winding circuit when the switches are set for six-pole operation. During six-pole operation, winding portions 308, 310 are electrically connected in series. Thus, the motor can selectively switch between 2-pole operation and six-pole operation by switching the electrical connection of winding portions 308, 310 from series to parallel and vice versa.

By comparing FIGS. 3B and 3C, it can be seen that the direction of current through winding portion 308 (and coil set 304) is reversed when the motor is switched from two-pole operation (FIG. 3B) to six-pole operation (FIG. 3C), and vice versa. The direction of current through winding portion 310 (and coil sets 302, 306) is the same during two-pole operation and six-pole operation.

In FIGS. 3A-3C, winding portion 308 has substantially the same number of effective turns as winding portion 310. This prevents or minimizes damaging circulating currents when winding portions 308, 310 are electrically connected in parallel. Similarly, winding portion 308 preferably has the same winding resistance and leakage reactance as winding portion 310.

Figure 4A:
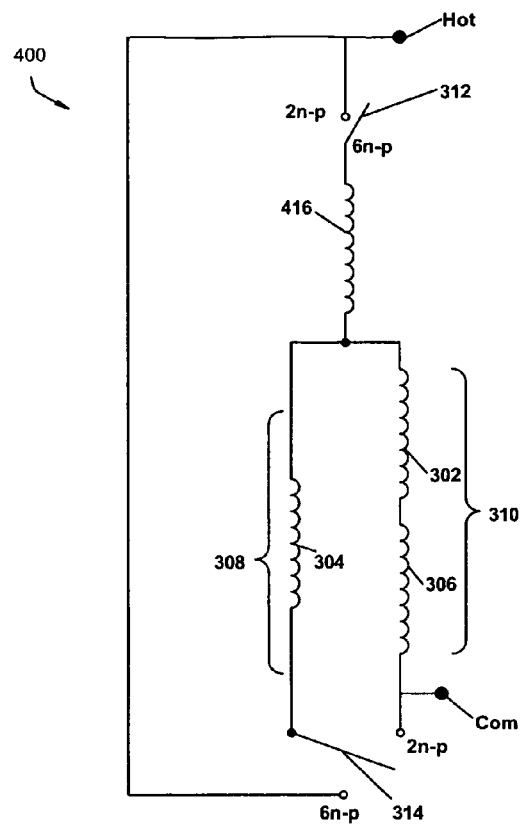
FIGS. 4A-4C are stator winding circuit schematics for an induction motor having an additional coil for providing a different number of effective turns during 2-pole operation, as compared to the embodiment of FIGS. 3A-3C.
Figure 4B:
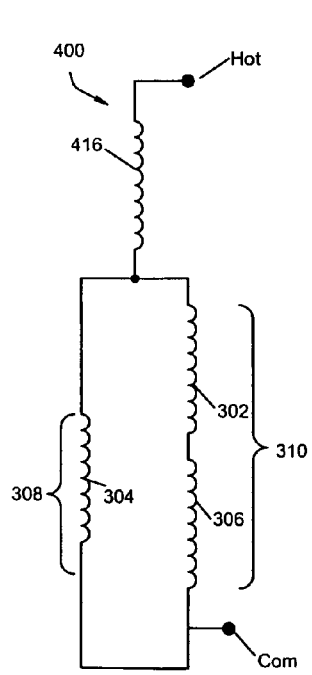
Figure 4C:
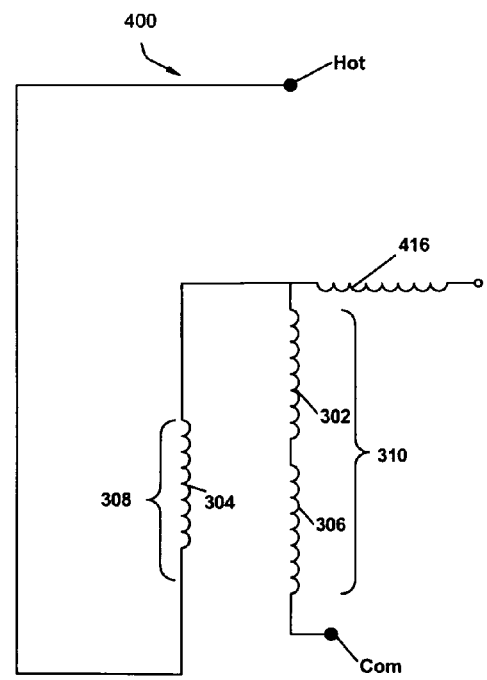

FIGS. 4A-4C illustrate a main winding circuit 400 for an induction motor according to another embodiment. As shown in FIG. 4A, the main winding circuit 400 has the same configuration as the main winding circuit of FIG. 3A, except for the addition of coil set 416.

FIG. 4B illustrates the main winding circuit 400 during 2-pole operation. During 2-pole operation, the main winding circuit 400 has the same configuration as that shown in FIG. 3B, except for the addition of coil set 416. Thus, during 2-pole operation, the main winding of FIG. 4B has a greater number of effective turns (and thus less air gap flux density) than the main winding of FIG. 3B, due to coil set 416. The addition of coil set 416 also reduces winding harmonics during 2-pole operation as compared to the main winding circuit of FIG. 3B. As shown in FIG. 4C, coil set 416 is removed from the main winding circuit 400 during 6-pole operation. Thus, the additional coil set 416 has no effect on the number of effective turns during 6-pole operation. During 6-pole operation, the main winding circuit 400 has the same configuration as the main winding circuit 300 of FIG. 3C.

In one preferred embodiment, the addition of coil set 416 results in the main winding having about ⅓ of the effective turns during 2-pole operation as compared to 6-pole operation (under the same voltage and frequency) so as to provide a desired amount of air gap flux density.

In the embodiment shown in FIGS. 4A-4C, coil sets 302, 304, 306 are energized during 2-pole operation and during 6-pole operation, whereas coil set 416 is energized during 2-pole operation but not during 6-pole operation. Thus, a majority of coil sets 302, 304, 306, 416 are shared and energized during both 2-pole and 6-pole operation. The sharing of coil sets 302-306 provides a substantial reduction in active material as compared to, for example, a motor having independent windings for 2- and 6-pole operation.

Figure 5A:
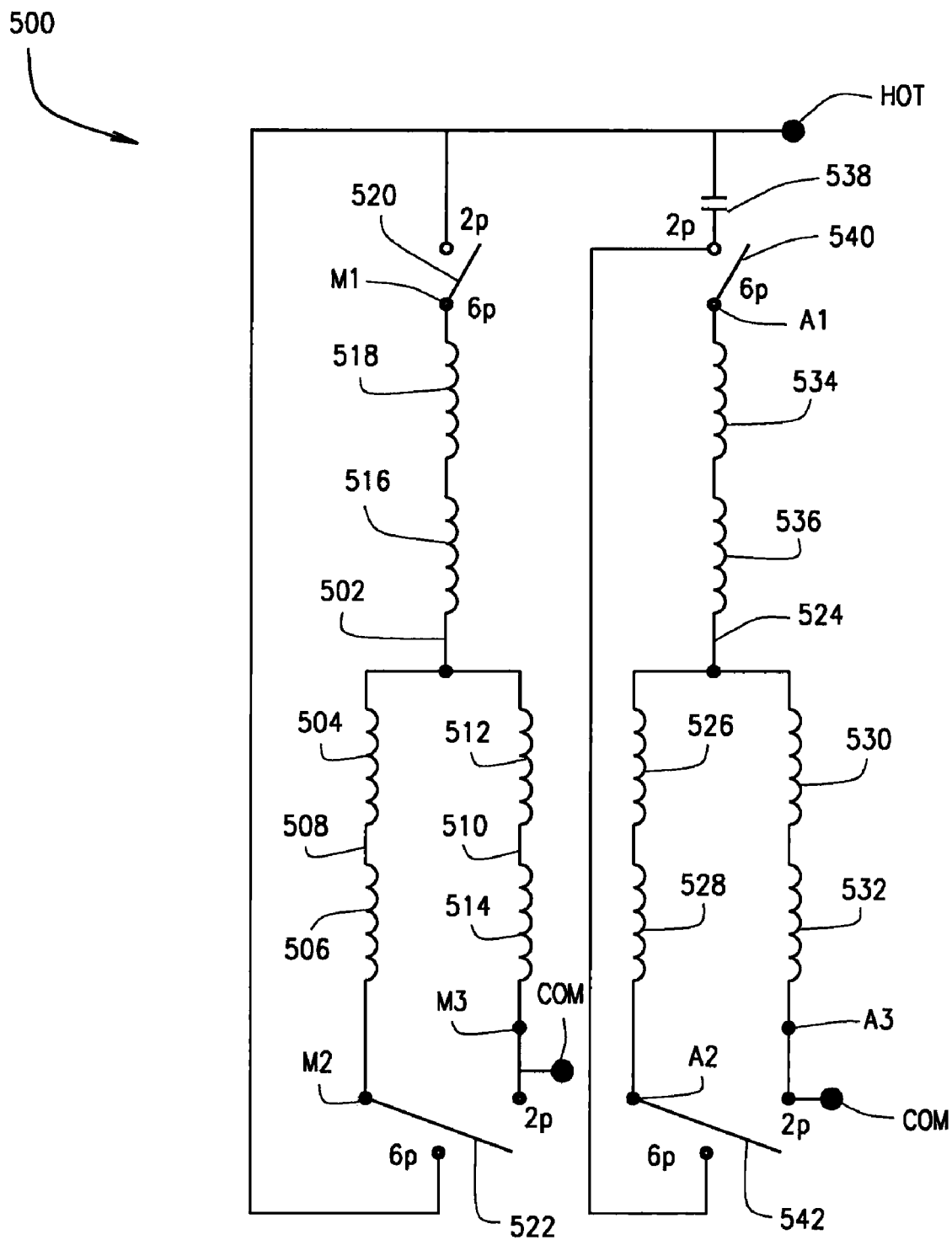
FIG. 5A is a stator winding circuit schematic for a PSC motor according to still another embodiment.

FIG. 5A illustrates a stator circuit 500 for a PSC motor according to another embodiment. The stator circuit 500 includes a main winding circuit 502 and an auxiliary winding circuit 524 electrically connected in parallel. The main winding circuit 502 is similar to the main winding circuit of FIG. 4A, except that two of the coil sets 304, 416 in FIG. 4A are divided into additional coil sets 504, 506, 516, 518 in FIG. 5A. As further noted below with reference to FIG. 5B, this approach results in a substantially even slot fill in the wound stator. As further shown in FIG. 5A, the auxiliary winding circuit 524 has substantially the same configuration as the main winding circuit 502, but includes a capacitor 538.

The main winding circuit 502 includes winding portions 508 and 510. Winding portion 508 includes coil sets 504, 506. Winding portion 510 includes coil sets 512, 514. Similar to other embodiments, winding portions 508, 510 have substantially the same number of effective turns, as well as the same winding resistance and leakage reactance, so as to prevent or minimize damaging recirculating currents.

Figure 5B:
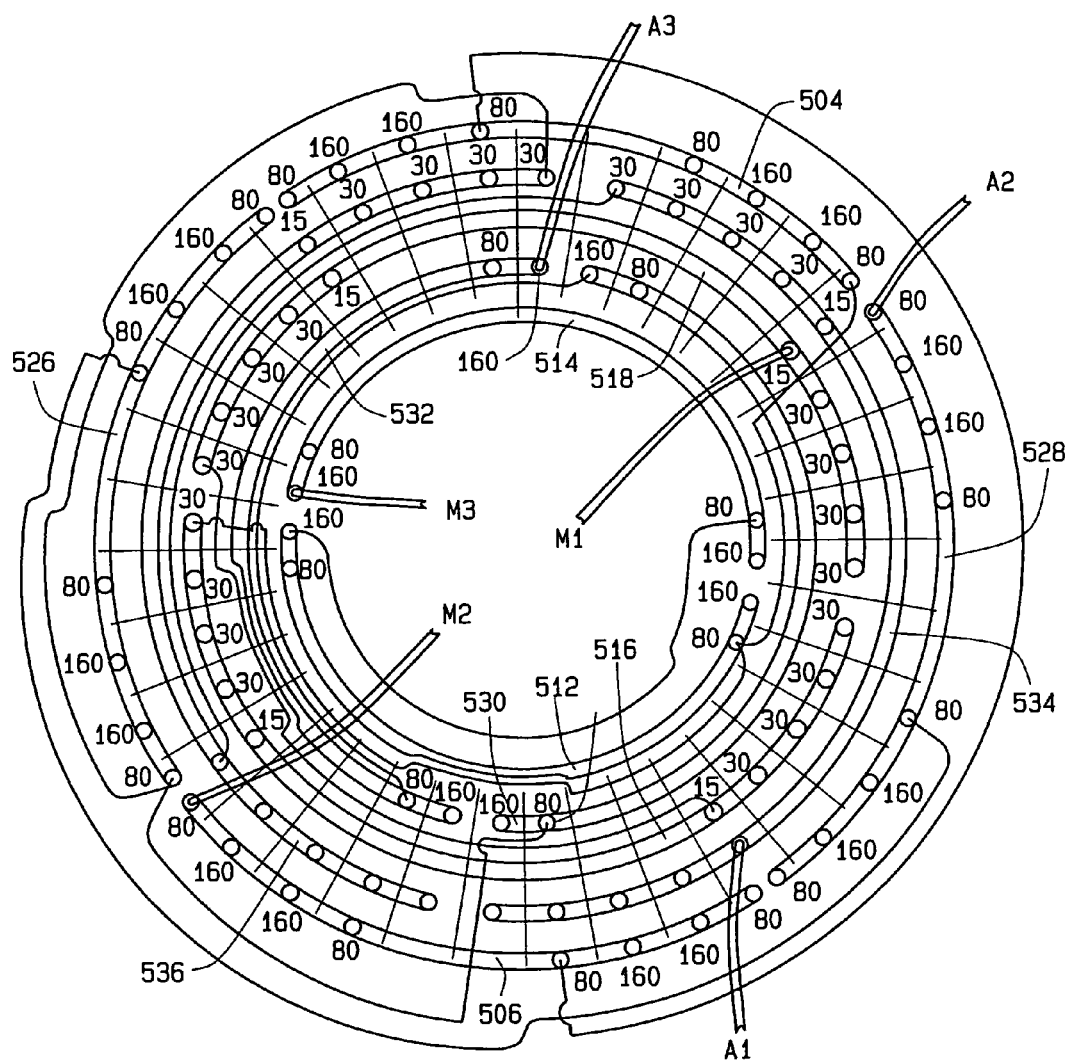
FIG. 5B is a winding diagram for the stator winding circuit illustrated in FIG. 5A.

FIG. 5B is a winding diagram for the stator circuit 500 of FIG. 5A. FIG. 5B illustrates each of the coil sets 504, 506, 512, 514, 516, 518 of the main winding circuit 502, and each of the coil sets 526, 528, 530, 532, 534, 536 of the auxiliary winding circuit 524 shown in FIG. 5A. Also shown in FIG. 5B are the connection nodes M1-M3 and A1-A3 for the switches 520, 522, 540, 542 shown in FIG. 5A, as well as the number of actual turns (i.e., 15, 30, 80 or 160) of each coil set in this particular embodiment.

As apparent to those skilled it the art, FIG. 5B illustrates a generally even slot fill for the main winding circuit 502 and the auxiliary winding circuit 504. Further, FIG. 5B illustrates that winding portion 508 (coil sets 504, 506) has a different number of actual turns, and a different winding pitch (i.e., the number of slots spanned by the coil sets) than winding portion 510 (coil sets 512, 514). However, winding portions 508 and 510 have the same number of effective turns, as noted above.

Although the induction motor designs discussed above focus on two-speed operation (i.e., 2-pole operation and 6-pole operation), it should be noted that additional pole speeds can be supported without departing from the scope of this disclosure.

Figure 6:
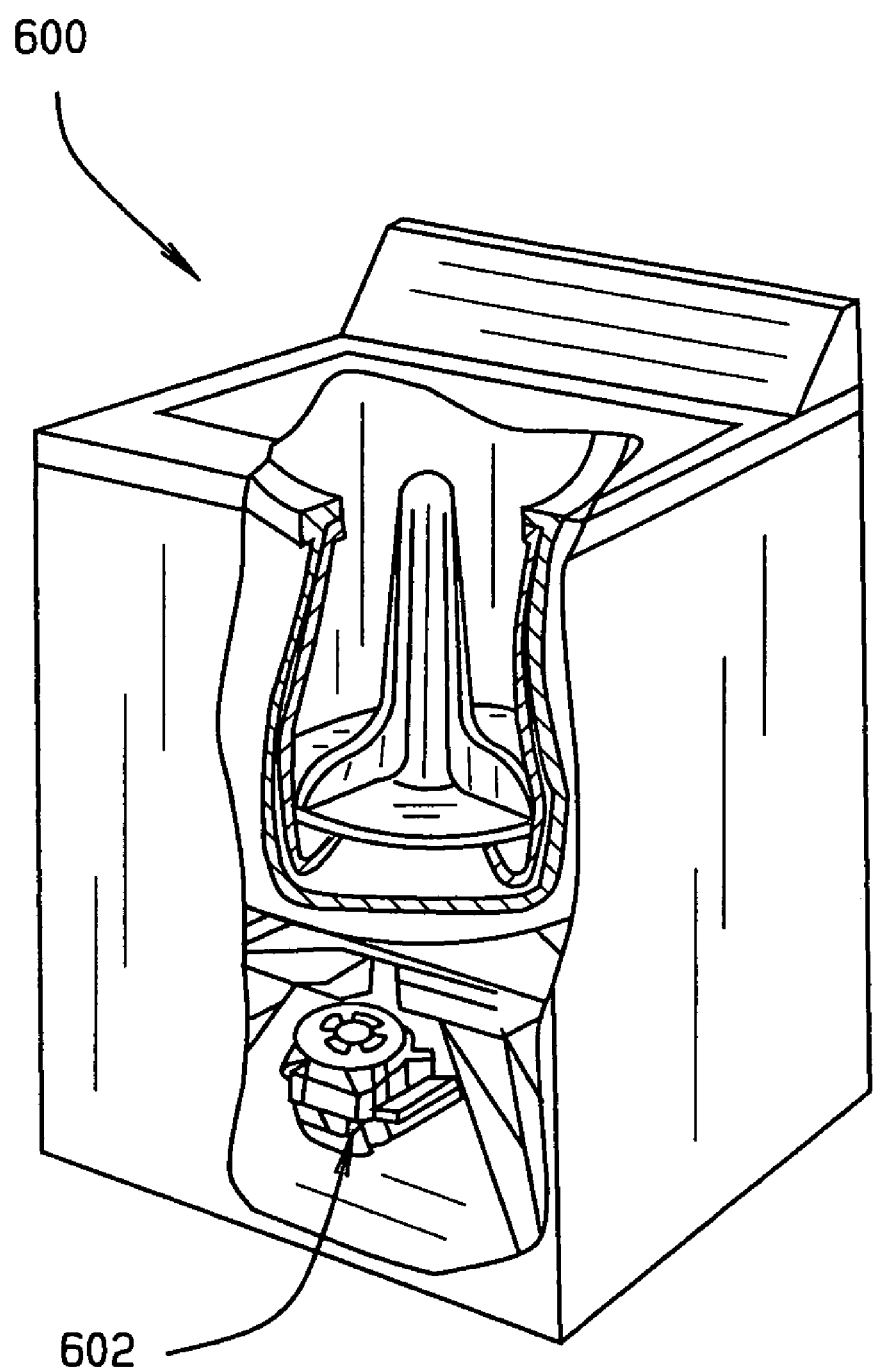
FIG. 6 is a perspective view of a clothes washing machine according to another embodiment.

FIG. 6 illustrates a clothes washing machine 600 according to another embodiment. The washing machine 600 includes an electric motor 602. The motor 602 is a 2n/6n-pole motor having shared windings, where n is an integer. The motor 602 can employ any of the stator winding circuits described above, or other suitable circuits. In some embodiments, the motor 602 is a PSC motor and employs the winding circuit described above with reference to FIGS. 5A and 5B. The washing machine 600 can be automatic impeller machine, with the electric motor 602 reversing direction as necessary to reciprocate an impeller. Alternatively, the washing machine 600 can be an agitator washer employing a mechanical transmission such that the motor 602 rotates in only a single direction.

In one embodiment of an automatic impeller washer employing a PSC motor according to FIGS. 5A-5B and a pulley ratio of 3.9, the motor will achieve a speed of 230 rpm (for washing) during 6-pole operation and a speed of 718 rpm (for spinning) during 2-pole operation.

Although a vertical axis motor 602 is shown in FIG. 6, it should be understood that the teachings of this disclosure are applicable to horizontal and oblique angle motor applications as well.

What is claimed:

1. A multi-speed single-phase induction motor comprising a stator, the stator including a main winding selectively adapted for 2n-pole operation and 6n-pole operation, where n is an integer, the main winding including at least a first winding portion and a second winding portion, the first winding portion and the second winding portion each including one or more coil sets, the motor being configured to electrically connect the first winding portion and the second winding portion in series during one of the 2n-pole operation and the 6n-pole operation, and to electrically connect the first winding portion and the second winding portion in parallel during the other of the 2n-pole operation and the 6n-pole operation, wherein current flows through all the coil sets of the first winding portion in a first direction when the first winding portion and the second winding portion are connected in series, and through all the coil sets of the first winding portion in a second direction opposite the first direction when the first winding portion and the second winding portion are connected in parallel.

2. The motor of claim 1 wherein the first winding portion has substantially the same number of effective turns as the second winding portion.

3. The motor of claim 2 wherein the first winding portion and the second winding portion have different numbers of actual turns.

4. The motor of claim 3 wherein the first winding portion and the second winding portion have substantially the same winding resistance and leakage reactance.

5. The motor of claim 4 wherein the first winding portion has a different winding pitch than the second winding portion.

6. The motor of claim 3 further comprising a plurality of switches including a first single-pole, single throw switch and a first single-pole, double throw switch, wherein the motor is configured to electrically connect the first winding portion and the second winding portion in series during said one of the 2n-pole operation and the 6n-pole operation, and to electrically connect the first winding portion and the second winding portion in parallel during the other of the 2n-pole operation and the 6n-pole operation using only the first single-pole, single throw switch and the first single-pole, double throw switch.

7. The motor of claim 6 wherein the motor is a PSC motor and further comprises an auxiliary winding having a first winding portion and a second winding portion, and wherein the plurality of switches includes a second single-pole, single throw switch and a second single-pole, double throw switch, the motor being configured to electrically connect the first winding portion and the second winding portion of the auxiliary winding in series during one of the 2n-pole operation and the 6n-pole operation. and to electrically connect the first winding portion and the second winding portion of the auxiliary winding in parallel during the other of the 2n-pole operation and the 6n-role operation using only the second single-pole, single throw switch and the second single-pole, double throw switch.

8. The motor of claim 1 wherein the first winding portion includes a first coil set, and the second winding portion includes a second coil set and a third coil set electrically connected in series.

9. The motor of claim 8 wherein the first coil set, the second coil set and the third coil set each comprise a plurality of concentric coils having different winding pitches.

10. The motor of claim 1 wherein the main winding includes a third winding portion, and the motor is configured to electrically connect the third winding portion to the first winding portion and the second winding portion during 2n-pole operation but not during 6n-pole operation.

11. The motor of claim 10 wherein the main winding has about ⅓ of the effective turns during 2n-pole operation as compared to 6n-pole operation.

12. The motor of claim 1 wherein the motor includes a plurality of stator slots in which the main winding is distributed substantially evenly.

13. An impeller or agitator washing machine comprising the motor of claim 12.

14. The motor of claim 1 wherein the first winding portion and the second winding portion have substantially the same winding resistance and leakage reactance.

15. The motor of claim 14 wherein the first winding portion has a different winding pitch than the second winding portion.

16. A multi-speed single-phase induction motor comprising a stator, and a plurality of switches including a first single-pole, single throw switch and a first single-pole, double throw switch, the stator including a main winding selectively adapted for 2n-pole operation and 6n-pole operation, where n is an integer, the main winding including at least a first winding portion and a second winding portion, the motor being configured to electrically connect the first winding portion and the second winding portion in series during one of the 2n-pole operation and the 6n-pole operation, and to electrically connect the first winding portion and the second winding portion in parallel during the other of the 2n-pole operation and the 6n-pole operation using only the first single-pole, single throw switch and the first single-pole, double throw switch.

17. The motor of claim 16 wherein the motor is a PSC motor and further comprises an auxiliary winding having a first winding portion and a second winding portion, and wherein the plurality of switches includes a second single-pole, single throw switch and a second single-pole, double throw switch, the motor being configured to electrically connect the first winding portion and the second winding portion of the auxiliary winding in series during one of the 2n-pole operation and the 6n-pole operation, and to electrically connect the first winding portion and the second winding portion of the auxiliary winding in parallel during the other of the 2n-pole operation and the 6n-pole operation using only the second single-pole, single throw switch and the second single-pole, double throw switch.

18. The motor of claim 16 wherein the first winding portion and the second winding portion have substantially the same winding resistance and leakage reactance.

19. The motor of claim 16 wherein the first winding portion and the second winding portion each include one or more coil sets, and wherein current flows through all the coil sets of the first winding portion in a first direction when the first winding portion and the second winding portion are connected in series, and through all the coil sets of the first winding portion in a second direction opposite the first direction when the first winding portion and the second winding portion are connected in parallel.

20. A multi-speed single-phase induction motor comprising a stator, the stator including a main winding selectively adapted for 2n-pole operation and 6n-pole operation, where n is an integer, the main winding including at least a first winding portion and a second winding portion, the first winding portion having substantially the same number of effective turns as the second winding portion, the first winding portion having a different number of actual turns than the second winding portion, the motor being configured to electrically connect the first winding portion and the second winding portion in series during one of the 2n-pole operation and the 6n-pole operation, and to electrically connect the first winding portion and the second winding portion in parallel during the other of the 2n-pole operation and the 6n-pole operation.

21. The motor of claim 20 wherein the first winding portion and the second winding portion each include one or more coil sets, and wherein current flows through all the coil sets of the first winding portion in a first direction when the first winding portion and the second winding portion are connected in series, and through all the coil sets of the first winding portion in a second direction opposite the first direction when the first winding portion and the second winding portion are connected in parallel.

22. The motor of claim 21 wherein the first winding portion and the second winding portion have substantially the same winding resistance and leakage reactance.

23. The motor of claim 22 wherein the first winding portion has a different winding pitch than the second winding portion.

24. The motor of claim 21 wherein the motor is a PSC motor and further comprises an auxiliary winding having a first winding portion and a second winding portion, and wherein the plurality of switches includes a second single-pole, single throw switch and a second single-pole, double throw switch, the motor being configured to electrically connect the first winding portion and the second winding portion of the auxiliary winding in series during one of the 2n-pole operation and the 6n-pole operation, and to electrically connect the first winding portion and the second winding portion of the auxiliary winding in parallel during the other of the 2n-pole operation and the 6n-pole operation using only the second single-pole, single throw switch and the second single-pole, double throw switch.

25. The motor of claim 20 wherein the first winding portion and the second winding portion have substantially the same winding resistance and leakage reactance.

26. The motor of claim 25 wherein the first winding portion has a different winding pitch than the second winding portion.

27. The motor of claim 20 wherein the first winding portion includes a first coil set, and the second winding portion includes a second coil set and a third coil set electrically connected in series.

28. The motor of claim 27 wherein the first coil set, the second coil set and the third coil set each comprise a plurality of concentric coils having different winding pitches.

29. The motor of claim 20 wherein the main winding includes a third winding portion, and the motor is configured to electrically connect the third winding portion to the first winding portion and the second winding portion during 2n-pole operation but not during 6n-pole operation.

* * * * *

UNITED STATES PATENT AND TRADEMARK OFFICE
CERTIFICATE OF CORRECTION

PATENT NO. : 7,598,648 B2  
APPLICATION NO. : 11/295020  
DATED : October 6, 2009  
INVENTOR(S) : Renyan William Fei Page 1 of 1

It is certified that error appears in the above-identified patent and that said Letters Patent is hereby corrected as shown below:

At column 6, in claim 7, line 10, replace "6n-role" with "6n-pole".

Signed and Sealed this

Eighth Day of December, 2009

David J. Kappos  
*Director of the United States Patent and Trademark Office*

UNITED STATES PATENT AND TRADEMARK OFFICE
CERTIFICATE OF CORRECTION

PATENT NO. : 7,598,648 B2
APPLICATION NO. : 11/295020
DATED : October 6, 2009
INVENTOR(S) : Renyan William Fei It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 773 days.

Signed and Sealed this

Twenty-eighth Day of September, 2010

David J. Kappos
*Director of the United States Patent and Trademark Office*